(12) United States Patent
Kuroiwa et al.

(10) Patent No.: US 7,558,159 B2
(45) Date of Patent: Jul. 7, 2009

(54) RECORDER AND RECORDING MEDIUM

(75) Inventors: Toshio Kuroiwa, Yokohama (JP); Masayoshi Nishitani, Yokohama (JP)

(73) Assignee: Victor Company of Japan, Limited, Yokohama (JP)

( * ) Notice: Subject to any disclaimer, the term of this patent is extended or adjusted under 35 U.S.C. 154(b) by 484 days.

(21) Appl. No.: 11/442,252

(22) Filed: May 30, 2006

(65) Prior Publication Data

US 2006/0280084 A1 Dec. 14, 2006

(30) Foreign Application Priority Data

May 31, 2005 (JP) .......................... P2005-158800

(51) Int. Cl.
*G11B 7/085* (2006.01)
(52) U.S. Cl. .................. 369/30.07; 369/59.25
(58) Field of Classification Search .............. 369/30.08, 369/30.1, 53.2, 30.07, 30.11, 53.21, 53.22; 711/111–113, 170, 173, 202, 221
See application file for complete search history.

(56) References Cited

U.S. PATENT DOCUMENTS 5,740,435 A * 4/1998 Yamamoto et al. .......... 707/205

2004/0252605 A1 * 12/2004 Yoshida et al. ........... 369/47.22

FOREIGN PATENT DOCUMENTS

| JP | 08-227371 | 9/1996 |
| JP | 10-083330 | 3/1998 |

OTHER PUBLICATIONS

ISO/IEC 9293, Second edition, 52 pages, (1994).

* cited by examiner

*Primary Examiner*—Wayne R Young
*Assistant Examiner*—Brian Butcher
(74) *Attorney, Agent, or Firm*—The Nath Law Group; Jerald L. Meyer; Stanley N. Protigal

(57) ABSTRACT

Each record of a file recording management table has three fields: Type, Contents, and Next Record Number. The Type field indicates whether the record is a "file name record" that has file name information in the Contents field or a "consecutive recording area record" that has position information on a consecutive recording area (position information on a positionally consecutive recording area) of file data in the Contents field. The records are linked and are recorded in one physical recording area as one file recording management table.

2 Claims, 3 Drawing Sheets

| RECORD (RECORD NUMBER 1) | TYPE | FILE NAME RECORD |
|---|---|---|
| | CONTENTS | (FILE NAME)="FIRST.TXT" |
| | NEXT RECORD NUMBER | 2 |
| RECORD (RECORD NUMBER 2) | TYPE | CONSECUTIVE RECORDING AREA RECORD |
| | CONTENTS | (START LOGICAL BLOCK NUMBER, NUMBER OF BLOCKS)=(100,2) |
| | NEXT RECORD NUMBER | 3 |
| RECORD (RECORD NUMBER 3) | TYPE | CONSECUTIVE RECORDING AREA RECORD |
| | CONTENTS | (START LOGICAL BLOCK NUMBER, NUMBER OF BLOCKS)=(103,1) |
| | NEXT RECORD NUMBER | 0 |

FIG. 5

| | | |
|---|---|---|
| RECORD (RECORD NUMBER 1) | TYPE | FILE NAME RECORD |
| | CONTENTS | (FILE NAME)="FIRST.TXT" |
| | NEXT RECORD NUMBER | 2 |
| RECORD (RECORD NUMBER 2) | TYPE | CONSECUTIVE RECORDING AREA RECORD |
| | CONTENTS | (START LOGICAL BLOCK NUMBER, NUMBER OF BLOCKS)=(100,2) |
| | NEXT RECORD NUMBER | 3 |
| RECORD (RECORD NUMBER 3) | TYPE | CONSECUTIVE RECORDING AREA RECORD |
| | CONTENTS | (START LOGICAL BLOCK NUMBER, NUMBER OF BLOCKS)=(103,1) |
| | NEXT RECORD NUMBER | 0 |

RECORDER AND RECORDING MEDIUM

BACKGROUND OF THE INVENTION

1. Field of the Invention

The present invention relates to a recorder that records a file recording management table, prepared for managing digital data as a file, on a recording medium and a recording medium on which the file recording management table is recorded, and more particularly to a recorder that can quickly read information from, and write information to, a file management table and a recording medium on which the file recording management table is written.

2. Description of the Related Art

Optical discs used widely today are classified roughly into three types. The first is a ROM type disc from which data can only be read. This type of optical disc is used as a distribution medium of music and videos, and its representative example is a CD (Compact Disc) and a DVD-ROM (Digital Versatile Disc ROM). The second is an RW type disc to or from which data can be written or read repeatedly. This type of optical disc is used primarily by individual users for recording broadcasts, and its representative example is a DVD-RAM and a DVD-RW (DVD rewritable). The third is an R type disc to which data can be written once. The R disc is sometimes called a WORM type disc that is an abbreviation of Write Once Read Many. The R type disc, lower in cost as compared with an RW type disc, is used widely for saving video information, and its representative example is a CD-R (CD Recordable) and a DVD-R (DVD Recordable).

Data recorded on any of the above media is read by focusing a laser beam from an optical pickup, built in the disc drive unit, onto the disc surface and then interpreting the reflected beam. Data is recorded on an R type and an RW type recordable disc by controlling the intensity of laser radiation.

FIG. 1 shows the configuration of a standard optical disc recording/playback system. An optical disc drive 1 comprises an optical disc 2 to or from which data is recorded or played back, an optical pickup 3 for focusing a laser beam, a servo circuit 4 for controlling the position of the optical pickup for optimum recording and playback, a data processing circuit 5 for performing error correction coding and digital modulation for data to be recorded or played back, an interface 6 for converting data to allow a host (host computer) 8 to interpret data to be recorded or played back, and a drive control circuit 7 for controlling the whole system.

The host 8 is usually a personal computer to which not only the optical disc drive 1 but also other storage devices, such as a hard disk drive, are usually connected according to the interface standard common to the storage devices including the optical disk drive.

The host can treat an optical disc drive, on which a recording type disc is mounted, as if it was a string of recording blocks to and from which data can be written and read. A recording block (sector) can be specified by a numeric value called a logical address. The interface standard described above stipulates that the host issues a command, such as a read command and a write command, to the optical disc drive with a read/write start logical address and the number of transfer blocks specified and the transfer protocol for data that is recorded and played back.

Therefore, when the host 8 records generated data on a recording-type disc 2, the host 8 must first determine the write start logical address and the number of blocks in which data is to be written, issues a write command to the optical disc drive 1, and then sends recording data to the optical disc drive 1.

The optical disc drive 1 receives the recording data via the interface 6, performs error correction coding and modulation processing for the recording data via the data processing circuit 5, and drives the optical pickup 3 to write the recording data.

The disc 2 also has addresses written in advance on the whole recording surface for determining recording positions. Those addresses are generally called physical addresses. The drive control circuit 7 converts the recording start logical address, specified by the host 8, to an appropriate physical address and controls the positioning of the optical pickup 3 and the recording start time. This address conversion is usually made by a simple method, for example, by adding a constant offset to the logical address.

On such an optical disc, recording data is usually managed as a file. That is, to distinguish a sequence of recording data (one file) from another sequence of recording data (another file), the identification information on the sequence of recording data and the information on the recording position on the disc are recorded as file system data separately from the recording data. Although supplementary information on a file includes the data size and the recording date/time of the file, the most basic information representing a file is the file name that identifies the file and the extent information on the recording position of the file on the disc.

FIG. 2 shows an example of file system data that has been conventionally used. FIG. 2 shows the configuration of file system data according to the ISO/IEC 9293 standard. This file system data is composed of a FAT (File Allocation Table) including FAT items, each 12 bits or 16 bits long, and directory items (directory records DR (Directory Record)).

The recording data area is managed in units, called clusters, each of which is composed of multiple consecutive logical blocks on the disc. The FAT items are numbered sequentially in order of occurrence in the FAT with one FAT item corresponding to one cluster on the disc. The value of 0, if stored in the nth FAT item, indicates that data can be written in the nth cluster. A non-zero value in the nth FAT item indicates that file data is already written in the nth cluster on the disc. A non-zero value in a FAT item indicates either the number of the cluster in which the next file data is stored or a special value indicating that the corresponding cluster is the last cluster of the file data.

On the other hand, a directory record DR contains information on a specific file; that is, a directory record contains a file name that is file identification information and the number of a cluster in which the first data of the file is stored. This cluster number is used as a link to a FAT item.

Therefore, in the example shown in FIG. 2, the recorder/player reads the directory record DR, recognizes the file name, and recognizes that the first cluster of the file is cluster 98. After that, the recorder/player reads the 98th FAT item and recognizes that the next cluster, in which the next file data is recorded, is cluster 100. Next, the recorder/player reads the 100th FAT item and, upon detecting that the item contains a special value (4095 in this example), recognizes that the cluster 100 is the last cluster of the file. In this way, the recorder/player reads the file system data and identifies a file recorded on the disc.

The file system data recording method described in this "Description of the Related Art" satisfies the need to have the recorder/player recognize a file name and the recording area of the file recorded on the recording medium. However, this method requires both a FAT item and a directory record DR to get file information composed of a file name and its recording area.

Because the FAT items and directory records DR are usually recorded in different positions on a disc, the optical pickup must be moved on the disc to allow the recorder/player to read this information. The optical pickup movement operation, called a seek operation, consumes relatively a long time, resulting in the problem that it takes long until the recorder/player completes reading the file system data.

In addition, when the file system data is updated as a file is added or an existing file is updated, both the FAT items and the directory records DR must also be updated. During this update, the write operation involves the seek operation that consumes time in updating the file system data.

SUMMARY OF THE INVENTION

In view of the foregoing, it is an object of the present invention to provide a recorder and a recording medium that further increase the speed of the read/write operation of file system data (file recording management table) prepared for managing data as a file.

To achieve the above object, according to one aspect of the present invention, there is provided a recorder that records file management data, created for managing data as a file, and the file on a recording medium, comprising: a record generation unit that creates a first record and a second record, the first record describing file name information that is information on a file name of the file, the second record describing recording area information that is information on a recording area position in which the file is recorded; a memory unit that stores the first and second records generated by the record generation unit; and a recording unit that sequentially reads the first and second records from the memory unit and records a file recording management table, in which the first and second records are arranged, in one predetermined physical recording area on the recording medium as file management data, wherein the record generation unit generates each of the first and second records as a record having three fields, first to third, the first record being generated as a record comprising the first field describing identification information indicating that the record has the file name information; the second field describing the file name information; and the third field describing record specification information, which specifies a next record following the first record, as file management information on the same file, the second record being generated as a record comprising the first field describing identification information indicating that the record has the recording area information; the second field describing the recording area information; and the third field describing either record specification information, which specifies a next record following the second record, as file management information on the same file or information, which indicates that the second record is an end record, as information on the same file, and when a recording area of the same file is composed of a plurality of positionally non-consecutive divided recording areas, a plurality of the second records are generated, one for each divided recording area for describing the recording area information corresponding thereto and wherein the recording unit arranges the first and second records based on the information described in the third fields of the first and second records.

To achieve the above object, according to another aspect of the present invention, there is provided a recording medium on which file management data, created for managing data as a file, and the file are recorded, wherein a file recording management table, in which a first record and a second record are arranged, is formed in one predetermined physical recording area as file management data, the first record describing file name information that is information on a file name of the file, the second record describing recording area information that is information on a recording area position in which the file is recorded, wherein each of the first and second records has three fields, first to third, the first record comprising the first field describing identification information indicating that the record has the file name information; the second field describing the file name information; and the third field describing record specification information, which specifies a next record following the first record, as file management information on the same file, the second record comprising the first field describing identification information indicating that the record has the recording area information; the second field describing the recording area information; and the third field describing either record specification information, which specifies a next record following the second record, as file management information on the same file or information, which indicates that the second record is an end record, as information on the same file, wherein, when a recording area of the same file is composed of a plurality of positionally non-consecutive divided recording areas, a plurality of the second records are arranged, one for each divided recording area for describing the recording area information corresponding thereto, in the file recording management table and wherein the first and second records are arranged in the file recording management table according to the arrangement sequence indicated by the information described in the third fields of the first and second records.

The recorder according to the present invention links multiple records to manage data as a file and records the linked records on a recording medium as one file recording management table. This file recording management table eliminates the need for the pickup seek operation during the write operation of the file recording management table and allows the recorder to quickly write information in the file recording management table. This file recording management table recorded by the recorder according to the present invention also eliminates the need for the pickup seek operation during the read operation and allows the player to quickly read information from the file recording management table.

In addition, on the recording medium according to the present invention, one file recording management table, in which multiple records are linked to manage data as a file, is recorded. This configuration eliminates the need for the pickup seek operation when the file recording management table is read, thus allowing the player to read data quickly when data is played back.

The nature, principle and utility of the invention will become more apparent from the following detailed description when read in conjunction with the accompanying drawings.

BRIEF DESCRIPTION OF THE DRAWINGS

In the accompanying drawings:

FIG. 5 is a diagram showing the detailed configuration of the file recording management table shown in FIG. 4.

DESCRIPTION OF THE PREFERRED EMBODIMENTS

Figure 3:
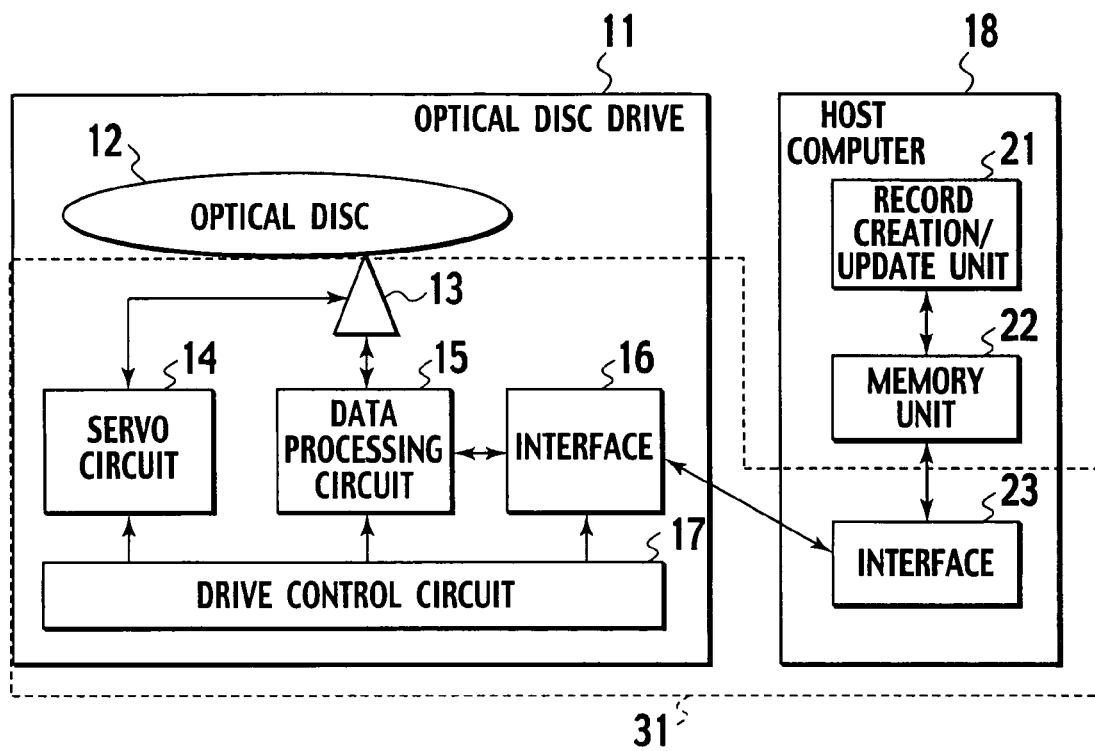
FIG. 3 is a diagram showing the configuration of an optical disc recorder/player in one embodiment of a recorder of the present invention.

FIG. 3 is a diagram showing the configuration of an optical disc recorder/player in one embodiment of a recorder according to the present invention.

Figure 1:
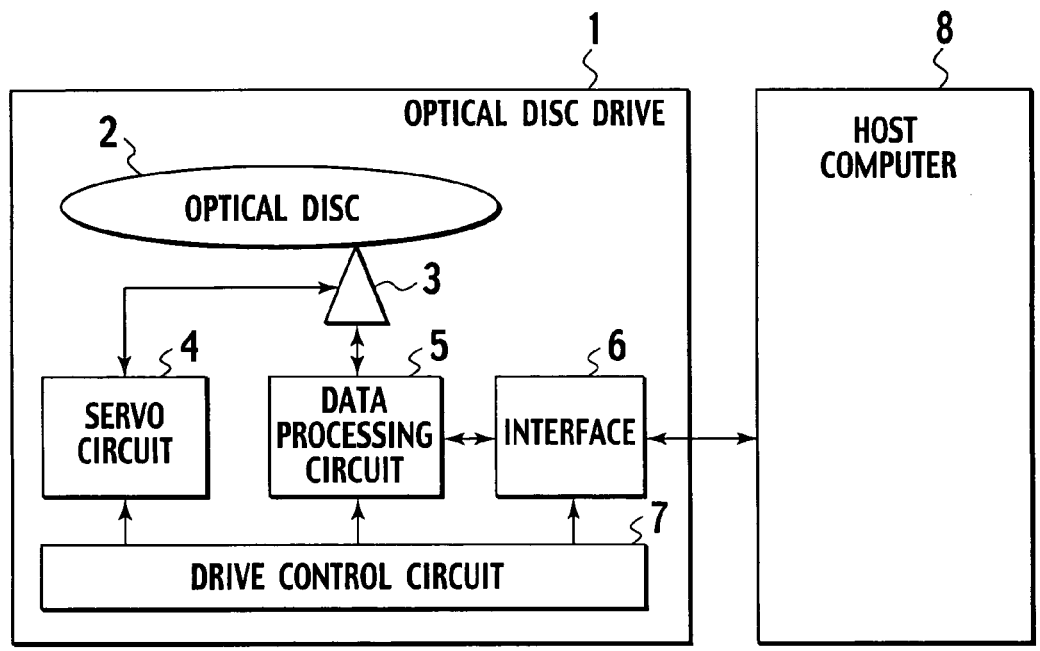
FIG. 1 is a diagram showing the configuration of a conventional optical disc recorder/player.
Figure 2:
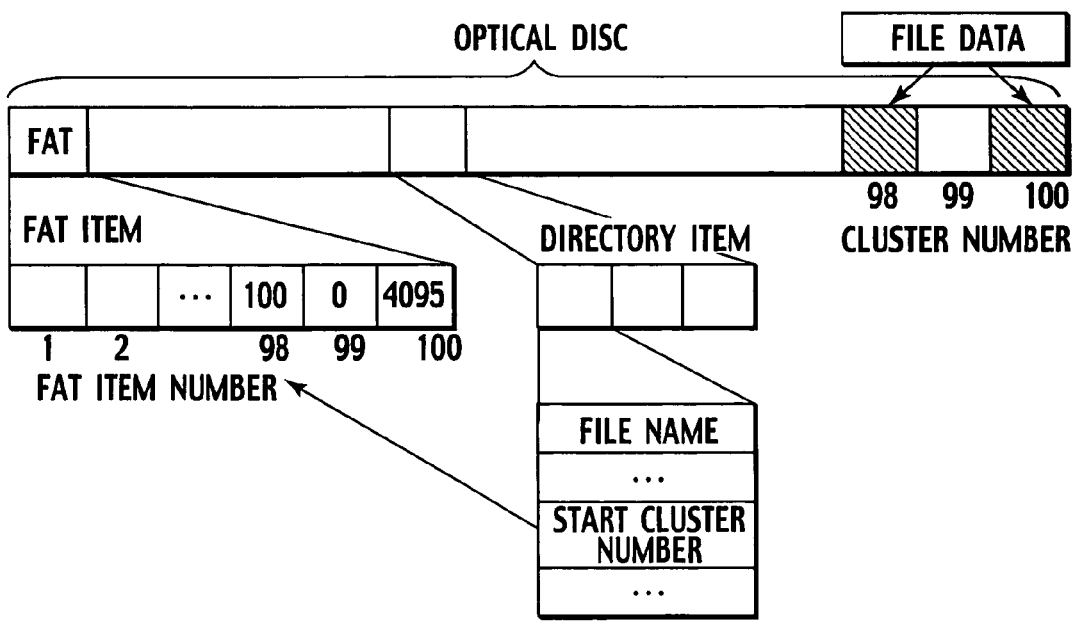
FIG. 2 is a diagram showing the configuration and layout of conventional file system data.

The optical disc recorder/player comprises an optical disc drive 11 and a host (host computer) 18. The host 18 includes a record creation/update unit 21, a memory unit 22, and an interface 23. The optical disc drive 11 comprises an optical pickup 13, a servo circuit 14, a data processing circuit 15, a drive control circuit 17, and an interface 16. The optical pickup 13, the servo circuit 14, the data processing circuit 15, the drive control circuit 17, and the interface 16 of the optical disc drive 11 and the interface 23 of the host 18 work together to function as a file recording management table write/read unit 31 for an optical disc 12. The optical pickup 13, the servo circuit 14, the data processing circuit 15, the drive control circuit 17, and the interface 16 of the optical disc drive 11 perform basically the same operation as that of the drive in the prior art shown in FIG. 1 and, therefore, the description is omitted. The interface 23 in the host 18 also performs basically the same function of a conventional general interface and, therefore, the description is omitted.

Figure 4:
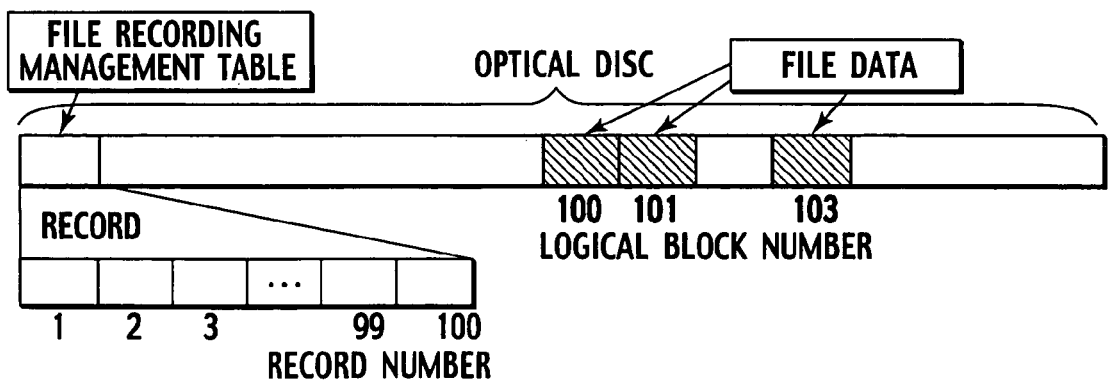
FIG. 4 is a diagram showing the general configuration and layout of a file recording management table created on the optical disc recorder/player in one embodiment.

The following describes how the optical disc recorder/player shown in FIG. 3 adds new file information (information including at least a file name and its recording area). FIG. 4 is a diagram showing the configuration and layout of file data and a file recording management table (file system data) in this embodiment. In this example, the file data of one file is recorded in three logical blocks on an optical disc, with addresses 100, 101, and 103 assigned to the logical blocks.

After file data is recorded, the file recording management table is recorded on the optical disc as the file system data. First, the following describes the structure of the file recording management table.

FIG. 5 shows the structure of the actual file recording management table. In this example, the file recording management table comprises three predetermined fixed-size records (three records with record numbers 1-3). Each record has three fields: Type, Contents, and Next Record Number.

The Type field is a field that indicates the type of data described in the Contents field, that is, this field identifies the description contents of the record (indicates the record type). This Type field indicates whether the record is a "file name record" that has file name information in the Contents field or a "consecutive recording area record" that has position information on the consecutive recording area (position information on positionally consecutive recording area) of the file data in the Contents field.

When the Type field indicates a "file name record", the Contents field contains the file name to identify the file (file managed by this record) from other files. As shown in the example in FIG. 5, the file name of the file is described using character code such as "FIRST.TXT".

When the Type field indicates a "consecutive recording area record", the Contents field contains the position information on the consecutive recording area on the optical disc (position information on positionally consecutive recording area) in which the file data of the file is stored. The position of the consecutive recording area is represented by the start logical block number and the number of consecutive blocks. The file data in the first part of the file shown in FIG. 4 occupies logical blocks 100 and 101. The Contents field representing this file data contains (100, 2) that means (start logical block number, number of consecutive blocks).

In addition, when the subsequent part of the file data of this file is recorded in a recording area (logical block 103) other than logical blocks 100 and 101 as shown in the example in FIG. 4, the third record, that is, the "consecutive recording area record", is added after the second record as shown in FIG. 5. That is, corresponding to logical block 103 in which the file data following that in logical blocks 100 and 101 is recorded, the consecutive recording area record that contains (103, 1) is stored in the Contents field to indicate (start logical block number, number of consecutive blocks).

When the file data recording area of the same file is composed of multiple positionally non-consecutive divided recording areas as shown in this example (one divided recording area of logical blocks 100 and 101 and another divided recording area of logical block 103), a recording area record (a recording area record whose Contents field contains position information on each divided recording area) corresponding to each divided recording area is provided.

The Next Record Number field of the records with record numbers 1 and 2 contains the record number of the linked record as the information identifying the next linked record (information for identifying the next record of the same file). As shown in FIG. 5, the Next Record Number field of the file name record with record number 1 contains 2, and the Next Record Number field of the consecutive recording area record with record number 2 contains 3. Those values indicate that three records with record numbers 1-3 are linked to form information on one file. The Next Record Number field of the consecutive recording area record with record number 3 contains a value, for example, 0, to indicate that the record is a special record; that is, this value indicates that the record is the last record of the same file.

Next, the following describes how the optical disc recorder/player shown in FIG. 3 records information in the file recording management table when a file is written.

The host 18 holds the file name information on a specified file and position information on the recording area of that file data in a storage unit not shown. The record creation/update unit 21 in the host 18 creates the records, shown in FIG. 5, based on the file name information and the position information on the recording area, and outputs the created records to the memory unit 22. The file recording management table write/read unit 31 reads the records sequentially from the memory unit 22 and writes them in a predetermined area on an optical disc so that the records are recorded in positionally consecutive area as a single file recording management table.

The file recording management table is configured on an optical disc as described above. Information on a newly added file can also be added to this file recording management table even when the table already contains the description of multiple files.

That is, when information on a newly added file is added, the write/read unit 31 reads the file recording management table, already present on the optical disc 12, from the optical disc 12 and holds the records included in that file recording management table in the memory unit 22 in the host 18. The record creation/update unit 21 in the host 18 newly creates the records for the newly added file. The memory unit 22 holds both the newly created additional records and the records included in the file recording management table that has been read. The write/read unit 31 sequentially reads the records held in the memory unit 22 and writes them in a predetermined area on the optical disc 12 in such a way that the records are written in a positionaly consecutive recording area as one file recording management table (overwrites the already recorded file recording management table). In this case, the file recording management table is updated in such a way that the records of the newly added file are added, for example, to the end of the old file recording management table.

As described above, the optical disc recorder/player links multiple records to manage the recording and playback of data as a file and records the linked records in a positionally consecutive recording area on a recording medium as one file recording management table. This file recording management table eliminates the need for the pickup seek operation during the write operation of the recording management table and allows the optical disc recorder/player to quickly write information in the file recording management table. This file recording management table also eliminates the need for the pickup seek operation during the read operation and allows the optical disc recorder/player to quickly read information from the file recording management table.

In addition, one file recording management table, in which multiple records are linked to manage the recording/playback of data as a file, is recorded in a positionally consecutive recording area on the optical disc 12. This configuration eliminates the need for the pickup seek operation when the file recording management table is read, thus allowing the player to read data quickly when data is played back.

It should be understood that many modifications and adaptations of the invention will become apparent to those skilled in the art and it is intended to encompass such obvious modifications and changes in the scope of the claims appended hereto.

What is claimed is:

1. A recorder that records file management data, created for managing data as a file provided on a recording medium, comprising:
   a record generation unit that creates a first record and a second record, said first record describing file name information comprising information on a file name of the file, said second record describing recording area information comprising information on a recording area position in which the file is recorded;
   a memory unit that stores the first and second records generated by said record generation unit; and
   a recording unit that sequentially reads the first and second records from said memory unit and records a file recording management table, in which the first and second records are consecutively arranged, in one predetermined physical recording area on said recording medium as file management data,
   wherein
      said record generation unit generates each of the first and second records having three fields, comprising a type field, a contents field and a next record number field, in common as the same recording format,
      said first record being generated as a record comprising the type field describing identification information indicating that the record has the file name information; the contents field describing the file name information; and the next record number field describing record specification information, which specifies a next record following the first record, as file management information on the same file,
      said second record being generated as a record comprising the type field describing identification information indicating that the record has the recording area information; the contents field describing the recording area information; and the next record number field describing either record specification information, which specifies a next record following the second record, as file management information on the same file or information, which indicates that the second record is an end record, as information on the same file, and
      when a recording area of the same file is composed of a plurality of positionally non-consecutive divided recording areas, a plurality of the second records are generated, one for each divided recording area for describing the recording area information corresponding thereto, and
   wherein said recording unit consecutively arranges the first and second records based on the information described in the next record number fields of the first and second records.

2. A recording medium on which file management data, created for managing data as a file, and the file are recorded,
   wherein a file recording management table, in which a first record and a second record are consecutively arranged, is formed in one predetermined physical recording area as file management data, said first record describing file name information comprising information on a file name of the file, said second record describing recording area information comprising information on a recording area position in which the file is recorded,
   wherein
      each of the first and second records has three fields, comprising a type field, a contents field and a next record number field, in common as the same recording format,
      said first record comprising the type field describing identification information indicating that the record has the file name information; the contents field describing the file name information; and the next record number field describing record specification information, which specifies a next record following the first record, as file management information on the same file, and
      said second record comprising the type field describing identification information indicating that the record has the recording area information; the contents field describing the recording area information; and the next record number field describing either record specification information, which specifies a next record following the second record, as file management information on the same file or information, which indicates that the second record is an end record, as information on the same file,
   wherein, when a recording area of the same file is composed of a plurality of positionally non-consecutive divided recording areas, a plurality of the second records are generated, one for each divided recording area for describing the recording area information corresponding thereto, in the file recording management table, and
   wherein the first and second records are consecutively arranged in the file recording management table according to the arrangement sequence indicated by the information described in the next record number fields of the first and second records.

* * * * *